Nov. 24, 1942.  A. R. MAIER  2,303,168

LUBRICATING BEARING HOUSING

Filed June 13, 1941

Inventor:
AUGUST R. MAIER,
by: John E. Jackson
his Attorney.

Patented Nov. 24, 1942

2,303,168

UNITED STATES PATENT OFFICE 2,303,168

LUBRICATING BEARING HOUSING

August R. Maier, Oil City, Pa., assignor to Oil Well Supply Company, a corporation of New Jersey Application June 13, 1941, Serial No. 397,964

4 Claims. (Cl. 308—187)

This invention relates to improvements in lubricating bearing housings.

In machines having rotating shafts and the like remote from a lubricant sump or splash system, it is customary to provide forced feed lubrication to such parts. Although such lubrication is adequate after the machine has been started, it does not supply sufficient lubricant upon starting, thereby frequently causing wear due to friction during the time lag prior to the forced flow of lubricant to the parts.

It is an object of my invention to provide a bearing housing having auxiliary means for positively lubricating the bearing therein, wherein such lubricating means is supplied with lubricant by a main or pressure lubrication system for the bearing.

A further object is to construct said auxiliary lubricating means in the bearing housing in such a manner as to not interfere with the assembly of bearing and housing with the shaft or the like to be supported thereby.

Figure 1:
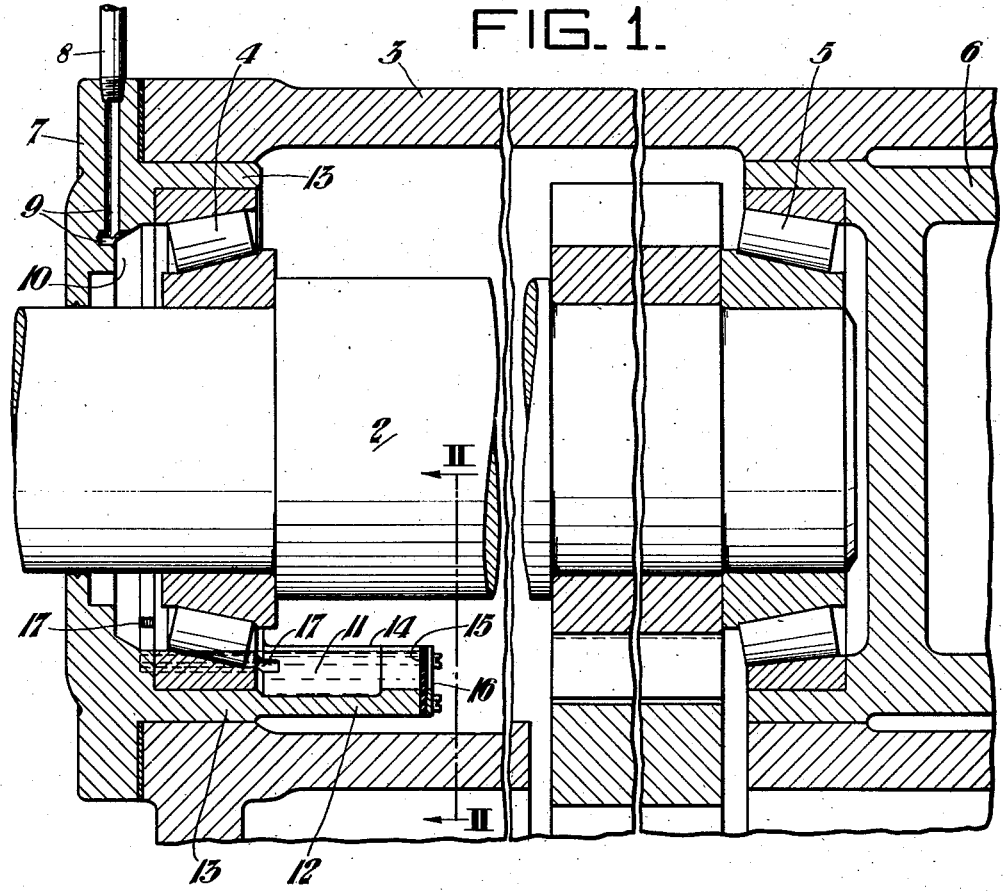
Figure 2:
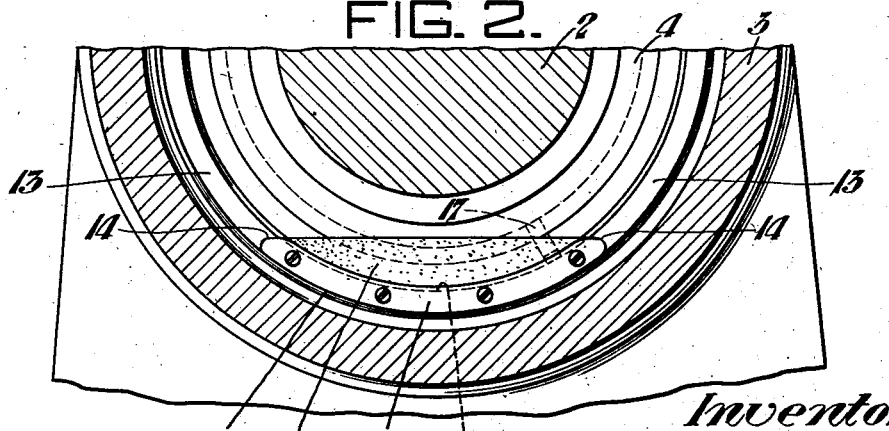

Additional objects and advantages will become apparent from the following description taken in connection with the accompanying drawing, wherein:

Fig. 1 is a cross sectional view of a rotatable shaft and its mounting, showing my improved bearing housing; and Fig. 2 is a sectional view taken on the line II—II of Fig. 1.

Referring to the drawing, 2 designates a rotatable shaft, which shaft, for example, may be the drive shaft associated with a crank shaft mechanism as shown in Shimer Patent No. 1,862,807, wherein the said shaft mounts a pinion for driving the crank shaft through engagement with the crank shaft gear. Such a mechanism is frequently employed in power slush pumps for well drilling use.

The shaft 2 is enclosed within a casing or body 3 and supported therein by anti-friction bearings 4 and 5, the inner bearing 5 being contained within a suitable cage 6 and the outer bearing 4 mounted in a bearing housing 7. Bearing 4 is too remote from any lubricant sump or gravity lubrication means for lubrication thereby, and is supplied from a pressure lubrication system in the conventional manner, as by a conduit 8 connected to the housing 7, communicating with the bearing by provided passages 9 and annular space 10 rearwardly of the bearing in said housing.

While such lubrication means is entirely adequate after starting the rotation of the shaft 2, it is desirable to supply auxiliary lubrication therefore during the starting of such rotation in order to insure a positive lubrication of the bearing 4, my invention being primarily concerned with providing such additional lubrication.

To this end, the housing 7 is provided with a lubricant well 11 beneath the bearing 4, including a shelf or projection 12 integral with the housing inwardly beyond the position of the bearing therein. As shown, said shelf 12 may be a substantial continuation of the annular sleeve portion 13 of the housing, which sleeve portion contains the outer race of bearing 4 and fits and bears in the casing 3, thereby providing a transversely arcuate upwardly concave receptacle for receiving lubricant therein.

In order that the lubrication means thus provided may be effective, the level of the lubricant therein must at least reach the locus of the lowermost extent of the bearing rollers or anti-friction members of bearing 4, whereby the lateral terminal walls 14 of the well 11 must have an elevation at least corresponding to such level, and likewise a transverse end retaining wall or dam 15 must have a corresponding height to enclose and retain the lubricant.

However, in such case the height and position of a rigid transverse dam or retainer will prevent the assembly of the bearing and housing with the shaft, since said retainer will interfere with the application of the housing 7 containing the outer race, over the rollers and inner race of bearing 4 on the shaft. In order to obviate such difficulty, I provide the retainer 15 of oil-resisting rubber or other flexible oil-proof composition or material, secured to the arcuate face of the shelf 12 by an arcuate clamp or plate 16 as by means of screws, the plate 16 being narrow so as not to confine the flexible upwardly extending body of the retainer which is capable of being deflected by the lowermost rollers of bearing 4 to permit the assembly of bearing and housing on the shaft.

To insure a ready supply of lubricant for the well 11, a channel 17 is formed in the housing 7 connecting the lower portion of the lubricant space 10 with said well by extending said channel beneath the outer race of the bearing 4. Hence, as the shaft is rotated and lubricated by the forced feed connection 8, the lubricant therefrom will flow from space 10 to fill the well 11 for initial lubrication of the bearing 4 when the shaft is rotated from rest.

In the particular example given of the pump drive shaft, the inner bearing 5 is adequately lubricated under all conditions by the presence of lubricant between the meshing gears, one of which runs in the lubricant, thereby taking care of starting lubrication by the squeezing of the lubricant from between the gears into the bearing. However, if such condition should prove inadequate, or in other assemblies wherein the same is not present, my improved bearing housing may be employed in the manner herein set forth to insure positive lubrication.

Various modifications and changes may be made within the scope of the following claims.

I claim:

1. A lubricating housing for a shaft anti-friction bearing or the like, including means adjacent the position of the outer bearing race therein providing a lubricant well, said means extending upwardly to an elevation above the locus of the lowermost extent of the anti-friction members of the bearing in said race from below said bearing members, a transversely disposed lubricant retainer closing an end of the well, said retainer having a flexible body portion extending above the said locus of the lower bearing members, permitting the passage of the said bearing members thereover by flexing said retainer in assembling the bearing and housing with a shaft.

2. A lubricating housing for a shaft anti-friction bearing or the like, including an annular sleeve portion containing the outer bearing race, an inwardly extending transversely arcuate shelf comprising a substantial continuation of the sleeve portion adjacent the lower portion of said bearing race, the contour of said shelf forming a lubricant well having the defining walls thereof extending to an elevation above the locus of the lowermost extent of the anti-friction members of the bearing, and a transversely disposed lubricant retainer closing the end of said arcuate shelf, said retainer having a flexible body portion extending to an elevation above said locus of the lower bearing members, permitting the passage of the said bearing members thereover by flexing the retainer in assembling the bearing and housing with a shaft.

3. The combination with a shaft anti-friction bearing or the like, of a housing for containing the outer race of said bearing, said housing having a lubricant space adjacent said race, means for supplying lubricant to said space, a shaft having the inner race and anti-friction members of the bearing thereon, an inwardly extending shelf on the housing adjacent the lower portion of the outer bearing race therein and having a lubricant well therein, said well extending upwardly to an elevation above the locus of the lowermost extent of the anti-friction bearing members from below said bearing members, a transversely disposed lubricant retainer closing an end of the well spaced from the said bearing members, said retainer having a flexible body portion extending above the said locus of the bearing members, permitting the passage of the bearing portion on the shaft thereover in assembling the bearing, shaft and housing by flexing said retainer, said housing having a lubricant channel connecting said lubricant space and well for supplying lubricant to the latter.

4. The combination with a shaft anti-friction bearing or the like, of a housing including an annular sleeve portion containing the outer race of the bearing, a shaft having the inner race and anti-friction members of the bearing mounted thereon, an inwardly extending transversely arcuate shelf comprising a substantial continuation of the sleeve portion adjacent the lower portion of the outer bearing race, the contour of said shelf forming a lubricant well having the defining walls thereof extending to an elevation above the lowermost extent of the anti-friction bearing members on the shaft, and a transversely disposed lubricant retainer closing the end of said arcuate shelf, said retainer having a flexible body portion extending to an elevation above the said lowermost extent of the anti-friction members, permitting the passage of the bearing portion on the shaft thereover in assembling the bearing, shaft and housing by flexing said retainer, said housing having a lubricant channel for supplying lubricant to the well.

AUGUST R. MAIER.